US007698351B1

(12) United States Patent
Hing et al.

(10) Patent No.: US 7,698,351 B1
(45) Date of Patent: Apr. 13, 2010

(54) GUI ARCHITECTURE FOR NAMESPACE AND STORAGE MANAGEMENT

(75) Inventors: Jeffrey Hing, Sunnyvale, CA (US); Jay Perry, San Jose, CA (US); Steven R. Klinkner, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 222 days.

(21) Appl. No.: 11/413,883

(22) Filed: Apr. 28, 2006

(51) Int. Cl.
G06F 12/00 (2006.01)

(52) U.S. Cl. .................................................... 707/827
(58) Field of Classification Search .................. 707/10
See application file for complete search history.

(56) References Cited

U.S. PATENT DOCUMENTS

| 5,377,191 | A | * | 12/1994 | Farrell et al. ................. 370/401 |
| 5,689,701 | A | | 11/1997 | Ault et al. |
| 5,742,806 | A | | 4/1998 | Reiner et al. |
| 6,061,743 | A | | 5/2000 | Thatcher et al. |
| 6,523,035 | B1 | * | 2/2003 | Fleming et al. ................ 707/10 |
| 6,865,719 | B1 | * | 3/2005 | Nicholas, III ................. 715/856 |
| 6,950,990 | B2 | * | 9/2005 | Rajarajan et al. ............. 715/736 |
| 6,966,033 | B1 | * | 11/2005 | Gasser et al. ................. 715/738 |
| 6,996,778 | B2 | * | 2/2006 | Rajarajan et al. ............. 715/734 |
| 7,003,527 | B1 | * | 2/2006 | Lavallee et al. .............. 707/102 |
| 7,032,186 | B1 | * | 4/2006 | Gasser et al. ................. 715/853 |
| 7,036,124 | B1 | * | 4/2006 | Patterson ..................... 718/104 |
| 7,055,014 | B1 | * | 5/2006 | Pawlowski et al. ........... 711/202 |
| 7,082,600 | B1 | | 7/2006 | Rau et al. |
| 7,143,235 | B1 | * | 11/2006 | Watanabe et al. ............ 711/114 |
| 7,162,509 | B2 | * | 1/2007 | Brown et al. ................. 709/201 |
| 7,210,131 | B2 | | 4/2007 | Schmidt et al. |
| 7,315,985 | B1 | * | 1/2008 | Gauvin et al. ................ 715/734 |
| 7,318,092 | B2 | * | 1/2008 | Sutler ........................... 709/223 |
| 2002/0116454 | A1 | | 8/2002 | Dyla et al. |
| 2002/0147696 | A1 | | 10/2002 | Acker et al. |
| 2002/0149615 | A1 | * | 10/2002 | Rajarajan et al. ............. 345/738 |
| 2002/0156865 | A1 | * | 10/2002 | Rajarajan et al. ............. 709/217 |
| 2002/0156932 | A1 | | 10/2002 | Schneiderman |
| 2002/0178271 | A1 | * | 11/2002 | Graham et al. ............... 709/229 |
| 2003/0160822 | A1 | * | 8/2003 | Belz et al. .................... 345/762 |
| 2003/0195870 | A1 | | 10/2003 | Newcombe et al. |
| 2004/0078397 | A1 | | 4/2004 | Mehta et al. |
| 2004/0122917 | A1 | | 6/2004 | Menon et al. |
| 2004/0267830 | A1 | | 12/2004 | Wong et al. |

(Continued)

OTHER PUBLICATIONS

Balasubramanian et al., System and Method for Data Migration Management in a Logical Namespace of a Storage System Environment, U.S. Appl. No. 11/384,776, filed Mar. 20, 2005, 37 pages.

Kishore et al., System and Method for Integrating Namespace Management and Storage Management in a Storage Environment, U.S. Appl. No. 11/384,711, filed Mar. 20, 2006, 41 pages.

(Continued)

*Primary Examiner*—John R. Cottingham
*Assistant Examiner*—Mohammed R Uddin
(74) *Attorney, Agent, or Firm*—Cesari and McKenna, LLP

(57) ABSTRACT

A graphical user interface (GUI) architecture is configured to enable efficient management of resources in a storage system environment. The GUI architecture is embodied within a namespace and storage management (NSM) application as a GUI toolkit configured to produce reusable GUI components, such as a navigation frame, a wizard and a dialog box. In particular, the reusable wizard allows users to make intelligent choices toward successful completions of desired actions by, e.g., only requesting information needed to accomplish those actions.

35 Claims, 9 Drawing Sheets

U.S. PATENT DOCUMENTS

| | | | |
|---|---|---|---|
| 2005/0015761 A1 | 1/2005 | Chang et al. | |
| 2005/0125503 A1 | 6/2005 | Iyengar et al. | |
| 2005/0154731 A1 | 7/2005 | Ito et al. | |
| 2005/0210033 A1 | 9/2005 | Newcombe et al. | |
| 2005/0240654 A1 | 10/2005 | Wolber et al. | |
| 2006/0026219 A1* | 2/2006 | Orenstein et al. | 707/204 |
| 2006/0036570 A1 | 2/2006 | Schaefer et al. | |
| 2006/0123062 A1 | 6/2006 | Bobbitt et al. | |
| 2006/0195417 A1* | 8/2006 | Acharya et al. | 707/2 |
| 2007/0022087 A1* | 1/2007 | Bahar et al. | 707/1 |
| 2007/0050710 A1* | 3/2007 | Redekop | 715/523 |
| 2007/0055703 A1* | 3/2007 | Zimran et al. | 707/200 |
| 2007/0198458 A1 | 8/2007 | Pudipeddi | |
| 2007/0206630 A1* | 9/2007 | Bird | 370/465 |
| 2007/0244908 A1* | 10/2007 | Rajan | 707/10 |

OTHER PUBLICATIONS

Balasubramanian et al., Migration Engine for Use in a logical Namespace of a Storage Environment, U.S. Appl. No. 11/384,804, filed Mar. 20, 2006, 38 pages.

U.S. Appl. No. 11/414,593 entitled Namespace and Storage Management Application Infrastructure for Use in Management of Resources in a Storage System Environment, filed Apr. 28, 2006 by Steven Klinkner.

* cited by examiner

GUI ARCHITECTURE FOR NAMESPACE AND STORAGE MANAGEMENT

CROSS-REFERENCE TO RELATED APPLICATIONS

The present invention is related to the following commonly assigned U.S. patent application Ser. Nos. 11/414,593 titled, Namespace and Storage Management Application Infrastructure for Use in Management of Resources in a Storage System Environment, filed herewith, and 11/384,804 titled, System and Method for Integrating Namespace Management and Storage Management in a Storage System Environment, filed Mar. 20, 2006, which applications are hereby incorporated by reference.

FIELD OF THE INVENTION

The present invention relates to storage systems, and more specifically, to a graphical user interface for use in management of resources in a storage system environment.

BACKGROUND OF THE INVENTION

A storage system typically comprises one or more storage devices into which information may be entered, and from which information may be obtained, as desired. The storage system includes an operating system that functionally organizes the system by, inter alia, invoking storage operations in support of a storage service implemented by the system. The storage system generally provides its storage services through the execution of software modules, such as processes. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage system may be further configured to operate according to a client/server model of information delivery to thereby allow many clients to access information stored on the system. In this model, the storage system may be embodied as file server executing an operating system, such as the Microsoft® Windows™ operating system (hereinafter "Windows operating system"). Furthermore, the client may comprise an application executing on an operating system of a computer that "connects" to the server over a computer network, such as a point-to-point link, shared local area network, wide area network, or virtual private network implemented over a public network, such as the Internet. Each client may request the services of the server by issuing storage access protocol messages (in the form of packets) to the server over the network. By supporting a plurality of storage (e.g., file-based) access protocols, such as the conventional Common Internet File System (CIFS) and the Network File System (NFS) protocols, the utility of the server is enhanced.

To facilitate client access to the information stored on the server, the Windows operating system typically exports units of storage, e.g., (CIFS) shares. As used herein, a share is equivalent to a mount point or shared storage resource, such as a folder or directory that stores information about files or other directories served by the file server. A Windows client may access information in the directory by mounting the share and issuing a CIFS protocol access request that specifies a uniform naming convention (UNC) path to the share. The UNC path or pathname is an aspect of a Windows networking environment that defines a way for a client to refer to a unit of storage on a server. The UNC pathname is prefixed with the string \\ to indicate resource names on a network. For example, a UNC pathname may comprise a server name, a share (directory) name and a path descriptor that collectively reference a unit of storage or share. Thus, in order to access the share, the client typically requires knowledge of the specific physical location (i.e., the identity) of the server exporting the share.

Instead of requiring the client to provide the specific identity of the file server exporting the share, it is desirable to only require a logical pathname to the share. That is, it is desirable to provide the client with a globally unique pathname to the share without reference to the file server. The conventional Distributed File System (DFS) namespace service provides such a solution in a Windows environment through the creation of a namespace that removes the specificity of server identity. DFS is well-known and described in *DCE 1.2.2 DFS Administration Guide and Reference*, 1997, which is hereby incorporated by reference. As used herein, a namespace is a view of shared storage resources (such as shares) from the perspective of a client. The DFS namespace service is generally implemented using one or more DFS servers and distributed components in a network.

Using the DFS service, it is possible to create a unique pathname (in the form of a UNC pathname) for a storage resource that a DFS server translates to an actual location of the resource (share) in the network. However, in addition to the DFS namespace provided by the Windows operating system, there are many other namespace services provided by various operating system platforms, including the NFS namespace provided by the conventional Unix® operating system. Each service constructs a namespace to facilitate management of information using a layer of indirection between a file server and client accessing a shared storage resource (share) on the server. For example, a share may be connected or "linked" to a link point (link in DFS terminology or a mount point in NFS terminology) to hide the machine specific reference to the share. By referencing the link point, the client can automatically access information on the storage resource of the specific machine. This allows an administrator (user) to store the information on any server in the network by merely providing a reference to the information (or share). However, these namespaces are typically services created on heterogeneous server platforms, which leads to incompatibility and non-interoperability with respect to management of the namespaces by the user. For example, the DFS namespace service is generally limited to Windows-based operating system platforms, whereas the NFS namespace service is generally limited to Unix-based operating system platforms.

The Virtual File Manager (VFM™) developed by NuView, Inc. and available from Network Appliance, Inc., ("NetApp") provides a namespace service that supports various protocols operating on various file server platforms, such as NetApp filers and DFS servers. The VFM namespace service is well-known and described in *VFM™ (Virtual File Manager) Reference Guide, Version* 40, 2001-2003, and *VFM™ (Virtual File Manager) Getting Started Guide, Version* 4.0, 2001-2003.

A large-scale storage system environment may include many (e.g., hundreds of) storage systems hosting resources embodied as, e.g., storage and namespace objects. As used herein, namespace objects include namespaces, link points and shares, whereas storage objects include servers, files and disks. In order to perform namespace and storage management in such a large-scale storage system environment, it is desirable to provide a graphical user interface (GUI) of a management console that enables users to manage multiple storage system resources efficiently, e.g., as one or more groups of managed objects.

In addition, it is desirable to provide a GUI having an architecture that produces GUI components, such as dialog boxes ("dialogs") and wizards, which can be reused with various applications executing on the management console. As used herein, a dialog is a movable window that appears on a computer screen of the NSM console and that provides status, as well as available options for an application executing on the console. A wizard is an interactive utility that may be implemented as a sequence of dialogs adapted to guide a user through an operation flow, inputting information as required by the flow.

A simple operation flow as embodied in a wizard typically comprises a fixed number of pre-defined steps organized in a serial or linear manner. However, such a linear flow of operations is inflexible and may increase the number of steps the user must follow to initiate a task or action. As a result, it is further desirable to identify dependencies in the operation flow and exploit those dependencies to provide an optimized flow of operations that limits the number of steps that the user need follow. Moreover, it is desirable to provide a wizard that allows a user to make intelligent choices towards successful completion of a desired action using the optimized operation flow.

SUMMARY OF THE INVENTION

The disadvantages of the prior art are overcome by providing a graphical user interface (GUI) architecture configured to enable efficient management of resources in a storage system environment. The GUI architecture is embodied within a namespace and storage management (NSM) application as a GUI toolkit configured to produce reusable GUI components. The NSM application executes on a NSM console and interacts with an NSM server to integrate namespace management and storage management in the storage system environment. The NSM server, in turn, interacts with one or more remote agents installed on host machines in the environment to convey application programming interface (API) function calls (hereinafter "APIs") that enable remote management of the resources.

According to an aspect of the invention, the GUI toolkit includes an infrastructure adapted to produce GUI components, such as a navigation frame, a wizard and a dialog box (dialog). The GUI toolkit illustratively comprises a GUI thread that cooperates with a GUI library to provide user interface constructs used to generate layouts for these GUI components. For example, the layout of the dialog may be embodied in a plurality of forms, each having an OK button and a CANCEL button, with one form also having an APPLY button. The layout of the wizard may also be embodied in a plurality of forms, each having a BACK button, a NEXT button and a CANCEL button. The wizard layout further includes various panels that provide a flexible template for inserting images and content.

The layout of the navigation frame includes a forward/backward utility having a FORWARD button and a BACK button that enables a user to switch forward and back, respectively, between navigation panels of the frame. Notably, the navigation panels are simultaneously displayed within the frame, and include a hierarchy panel, an operations panel, a view panel and a display panel, the latter adapted to display managed objects. The managed objects may comprise namespace objects (e.g., link points, shares) as well as data management objects (e.g., servers, files, disks) that may be displayed on the display panel in either iconic or report format.

According to another aspect of the invention, the reusable wizard allows users to make intelligent choices toward successful completions of desired actions by, e.g., only requesting information needed to accomplish those actions. This aspect of the invention involves cooperation between the GUI library and GUI thread to create wizard templates that enable an optimized operation flow for each action, depending upon inputs by the user.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
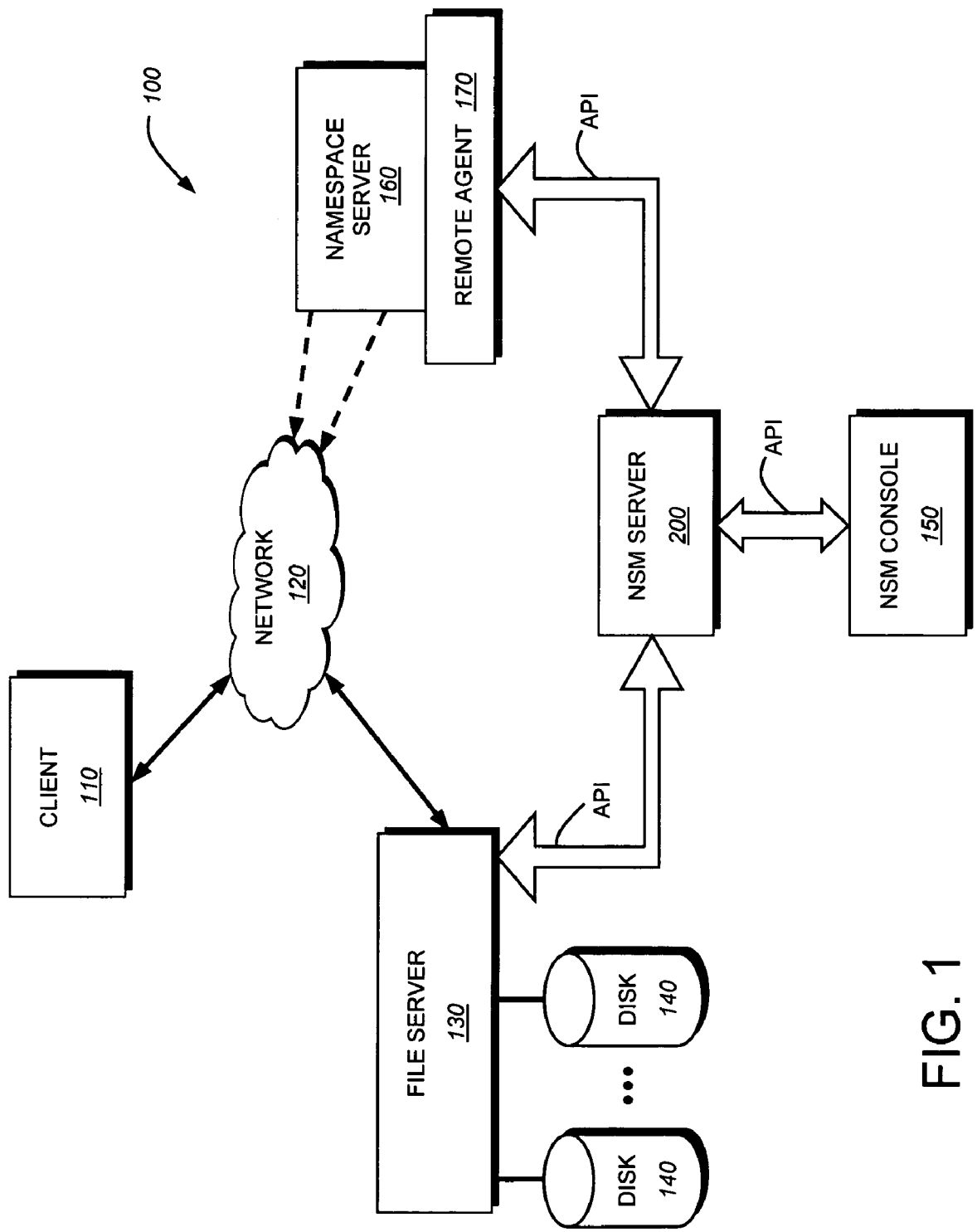
FIG. 1 is a schematic block diagram of an exemplary storage system environment is that may be advantageously used with the present invention.

FIG. 1 is a schematic block diagram of an exemplary storage system environment 100 that may be advantageously used with the present invention. The storage system environment comprises a plurality of storage systems configured to provide storage services relating to information stored on storage devices, such as disks 140. The storage systems include file servers 130 executing operating systems such as, e.g., the Microsoft® Windows™ operating system (hereinafter "Windows operating system"), the Unix® operating system and the NetApp® Data ONTAP™ operating system available from Network Appliance, Inc., Sunnyvale, Calif. One or more clients 110 may connect to the file servers over a computer network 120, such as a point-to-point link, shared local area network, wide area network, or virtual private network implemented over a public network, such as the Internet.

Each client 110 may comprise an application executing on an operating system of a general-purpose computer that interacts with the file servers 130 in accordance with a client/server model of information delivery. That is, the client may request the services of a server, and the server may return the results of the services requested by the client, by exchanging packets over the network 120. The client may issue packets including storage (e.g., file-based) access protocols, such as the Common Internet File System (CIFS) protocol or Network File System (NFS) protocol, over the Transmission Control Protocol/Internet Protocol (TCP/IP) when accessing information in the form of, e.g., files and directories.

To facilitate client access to the information stored on the server, a file server 130 executing, e.g., the Windows operating system typically exports units of storage, e.g., (CIFS) shares. A client 110 may access information of the share by mounting the share and issuing a CIFS protocol access request that specifies a uniform naming convention (UNC) path to the share. Although the illustrative embodiment is directed to a Windows file server that is accessed using the CIFS protocol, the invention described herein is not so limited and may also apply to other servers 130, such as Unix file servers and NetApp filers, that are accessible using other file access protocols, such as the NFS protocol. The client connects to file server 130 when accessing the share, typically by specifying the IP address (or identity) of the file server.

However, instead of requiring that the client know the specific identity of the server in order to access the share, a namespace server 160, such as the conventional Distributed File System (DFS) server, provides a namespace service that removes the specificity of server identity. Using the DFS service, a unique pathname (in the form of a UNC pathname) is created for the share that the DFS server translates to an actual location of the share in the network. For example, assume a client application issues a CIFS request to access information of a share stored on a file server 130 in the environment 100. The request is passed through various layers of the client's operating system including, e.g., a CIFS redirector. Before issuing a CIFS packet directed to a UNC pathname specified by the client application, the redirector contacts the DFS server to determine whether there is a different, actual pathname needed to access the information. If so, the DFS server returns that actual pathname to the redirector, which then uses that pathname to create the CIFS packet for transmission over the network. The DFS namespace service thus provides a level of indirection to a share that resides on a file server 130 in the environment 100.

Although the illustrative embodiment is directed to a DFS namespace service provided by the Windows operating system executing on a DFS server, the invention described herein is not limited and may also apply to other namespace services, such as the NFS namespace provided by the Unix operating system executing on a conventional Name Information Service (NIS) server. Each service constructs a namespace to facilitate management of information using a layer of indirection between a file server 130 and client 110 accessing a shared storage resource (share) on the server. However, these namespace services are created on heterogeneous server platforms, which lead to incompatibility and non-interoperability with respect to management of different namespaces by, e.g., an administrator (user).

In the illustrative embodiment, a namespace and storage management (NSM) server 200 is provided that integrates namespace management and storage management in storage system environment 100. The NSM server 200 includes an integrated management framework that provides an underlying infrastructure that supports various heterogeneous storage access protocols within a single, logical namespace service. To that end, the NSM server cooperates with a NSM console 150 and a remote agent 170 to create the integrated management framework. The integrated management framework, in turn, allows the NSM server 200 to interact with any namespace server, such as a DFS server configured to handle CIFS protocol requests or a NIS server configured to handle NFS protocol requests, directed to namespace services.

Figure 2:
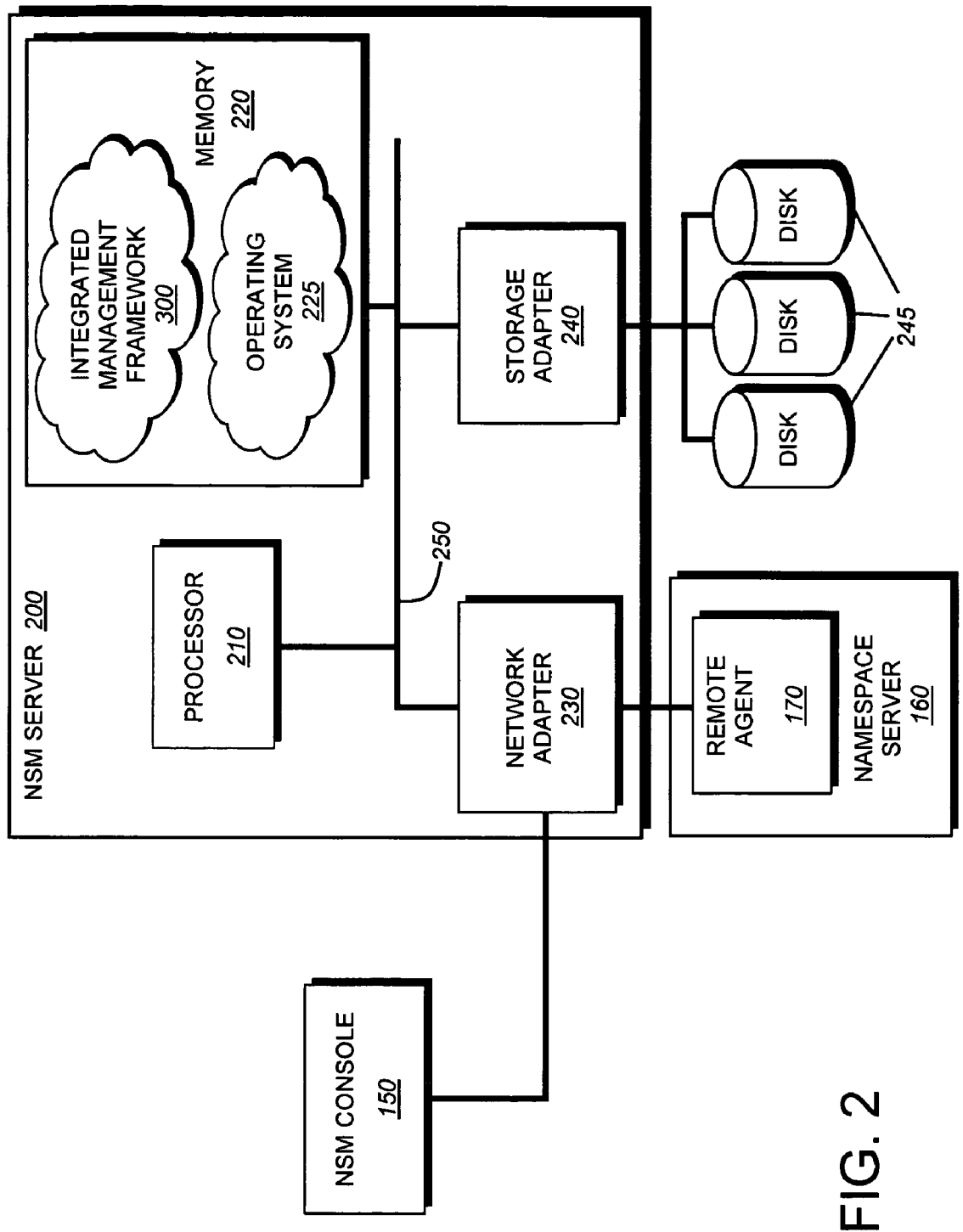
FIG. 2 is a schematic block diagram of an exemplary namespace and storage management server that may be advantageously used with the present invention.

FIG. 2 is a schematic block diagram of an exemplary namespace and storage management (NSM) server 200 that may be advantageously used with the present invention. The NSM server illustratively comprises a processor 210, a memory 220, a network adapter 230 and a storage adapter 240 interconnected by a system bus 250. The memory 220 may comprise storage locations addressable by the processor and adapters for storing software programs, i.e., specific sets of ordered operations, and data structures associated with the invention. The processor and adapters may, in turn, comprise processing elements and/or logic circuitry configured to execute the programs and manipulate the data structures. In particular, the storage adapter 240 comprises the mechanical, electrical and signaling circuitry needed to connect the server to storage devices, such as disks 245. Similarly, the network adapter 230 comprises the mechanical, electrical and signaling circuitry needed to connect the server 200 to, e.g., the NSM console 150 and remote agent 170.

An operating system 225, portions of which is typically resident in memory 220 and executed by the processing elements, functionally organizes the server by, inter alia, invoking operations in support of storage services implemented by the server. In the illustrative embodiment, the operating system is preferably the Windows operating system, although it is expressly contemplated that any appropriate operating system, such as the Unix operating system, may be enhanced for use in accordance with the inventive principles described herein. The operations invoked by the operating system are illustratively namespace and storage operations in support of an integrated management framework 300 provided by the server. It will be apparent to those skilled in the art that other processor and memory means, including various computer readable media, may be used for storing and executing program instructions pertaining to the invention described herein.

B. Integrated Management Framework

Figure 3:
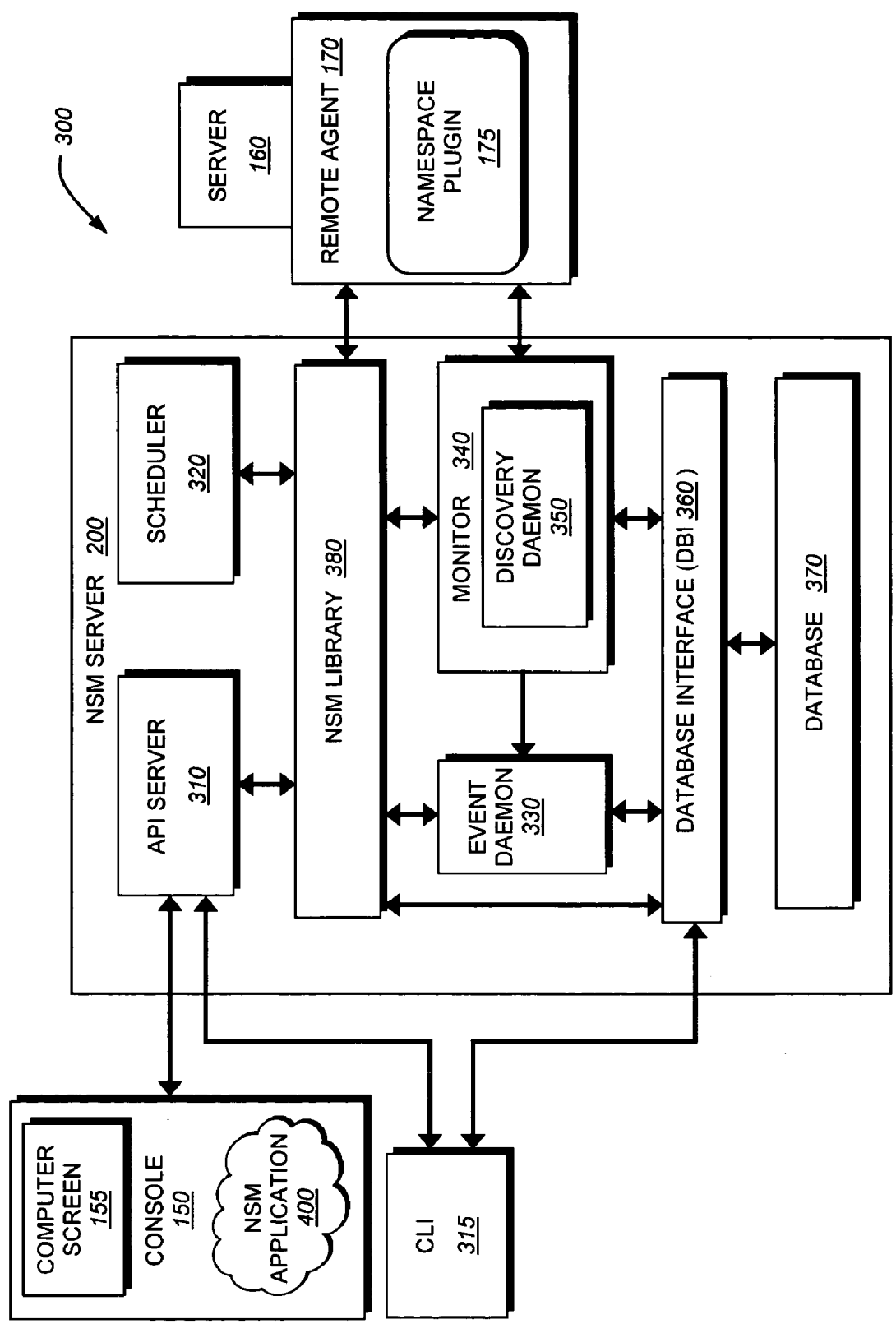
FIG. 3 is a schematic block diagram of an integrated management framework that may be advantageously used with the present invention.

The NSM server 200 generally provides its storage services through the execution of software modules, such as processes. These services are illustratively implemented as separately-scheduled processes (and/or daemons) that execute in user space of operating system 225 to provide the integrated management framework 300. As used herein, a process refers to an instance of a program being executed by, e.g., the processor and a thread is an instance of a sequence of the process's program code. FIG. 3 is a schematic block diagram of the integrated management framework 300 that may be advantageously used with the present invention. The integrated management framework 300 provides a logical namespace service that is based on extensions to underlying storage management technology and other technological components. Notably, these extensions are embodied as library functionality.

In the illustrative embodiment, the underlying storage management technology is embodied as DataFabric® Manager (DFM) technology available from Network Appliance, Inc., Sunnyvale, Calif. and described in *DataFabric® Manager* 3.2 *Administration Guide,* 1994-2004, which is hereby incorporated by reference. Broadly stated, the DFM technology comprises a set of coordinating processes, including an application programming interface (API) server 310, a scheduler 320, an Event daemon 330, a Monitor 340 including a Discovery daemon 350 and a database interface (DBI) 360 configured to interact with an embedded database 370. The capabilities of these processes are extended to create the integrated namespace and storage management framework 300 through the addition of NSM library functionality 380. The NSM library 380 is illustratively implemented as various library modules, each of which provides namespace and storage management actions embodied as APIs.

The integrated management framework 300 exposes a set of interfaces, e.g., an API interface that is used by the NSM console 150 and a command line interface (CLI 315), used by a communication protocol. Illustratively, the communication protocol is embodied as an XML over HTTP mechanism for APIs, primarily because of its ability to describe data conveyed over the network, as well as the transport, without describing the actual storage access protocol. An example of a communication protocol that may be advantageously used with the present invention is the ZAPI protocol available from Network Appliance, Inc. Such a protocol is also easily extensible and flexibly agnostic to binary formats of specific servers and clients to thereby operate efficiently in a heterogeneous environment.

In the illustrative embodiment, the integrated management framework 300 facilitates configuration and management of pathnames in the logical namespace. That is, the underlying infrastructure of the framework allows a user to manage various pathnames exported by heterogeneous namespace service and protocol implementations within the logical namespace. This aspect of the framework involves creation of a layer of abstraction that presents to a client a notion of the logical namespace that is accessible via a particular storage access protocol. As noted, the various heterogeneous namespace services are not interoperable with respect to user management; the integrated framework 300 extracts logical "views" (e.g., pathnames) from the namespaces exported by the heterogeneous services, stores those pathnames in database 370, and then configures the path-names so that they are accessible in the logical namespace via the storage access protocol.

In storage and networking environments, some operations can only be executed if a user (such as a system administrator) is logged into a server on which the operations are to be performed, e.g., the NSM server. In other words, a remote operation that is to be invoked on the server 200 can only be performed if the user is logged into the server. The NSM console 150 and remote agent 170 of the integrated management framework 300 address this problem. Illustratively, the NSM console 150 is a component of the framework that executes an NSM application 400 having a JAVA-based interface and the remote agent 170 is a software module installed on a host machine, such as a server 160, which manages a particular namespace, e.g., a DFS server. Using the communication protocol, the NSM console issues APIs to the NSM server which, in turn, issues APIs that are invoked on the remote agent to perform actions requested by the user.

Essentially, the remote agent 170 is a thin web server that includes "programmatic glue" to enable installation of plug-in modules ("plug-ins"). An example of a plug-in is a namespace management module 175 that allows remote access and management of data (e.g., pathnames) by the NSM server 200. Notwithstanding the particular namespace, the integrated management framework 300 involves installation of a remote agent 170 on a server 160 that manages the particular namespace and interacts with the NSM server 200 via APIs expose by the remote agent.

Illustratively, the remote agent 170 is installed on a machine that hosts a DFS server of a Windows/DFS environment. The namespace management plug-in module 175 may, in turn, be installed on the remote agent to enable communication with the NSM server 200 when accessing namespace information stored on the DFS server. Specifically, the NSM server issues APIs in connection with the communication protocol to instruct the remote agent 170 to perform certain actions. For example, in order to construct or change pathnames in the logical namespace, a user interacts with the NSM console 150 to access that namespace by, in effect, invoking a set of APIs on the NSM server 200 which, in turn, invokes a set of APIs on the remote agent 170. Once the NSM server has cooperated with the DFS server to construct the pathnames, those servers are no longer involved in client data accesses.

It should be noted that the underlying directory data structures used in the logical namespace reside on the namespace server 160 providing the particular namespace service, such as a DFS server. That is, the namespace server 160 implements the basic namespace; the NSM server 200 provides a service for configuring that namespace. To that end, the NSM server 200 cooperates with the remote agent 170 to acquire a copy of the namespace directory structures from the namespace server 160 and stores the copy on the embedded database 370. The NSM server then cooperates with the NSM console 150 to allow a user to manipulate (configure) the copy. Once configuration is complete, the server 200 cooperates with the remote agent to "push" (store) the manipulated copy of directory structures back to the namespace server 160.

The Monitor 340 is illustratively embodied as a multi-threaded process having a collection of individual monitor threads, each of which is scheduled by the scheduler 320. The Monitor 340 cooperates with the remote agent 170 to communicate with one or more machines/devices in the storage system environment 100 (using SNMP, RSH, etc) to collect any type of storage or data/namespace object information (e.g., volume and/or qtree information, as well as information about namespace servers) available in the environment and, to that end, functions as a data collector. Illustratively, each monitor thread is configured to collect information about a particular object in the environment. Extensions to the Monitor described herein are directed to namespace and agent management, each of which is illustratively embodied as an individual monitor thread.

As data is collected, the Monitor 340 determines whether it needs to notify any processes of some resulting condition. For example, an individual monitor thread may detect a threshold and the occurrence of some type of event. As used herein, an event is a synchronous notification with a severity attribute. By configuring thresholds, the NSM server 200 can determine when an event occurs. If a threshold is exceeded, the Monitor 340 communicates with the Event daemon 330 to notify it of that event. Thus, the Monitor 340 is configured to detect certain events and, in response, generate event notifications to the Event daemon 330. The Event daemon 330 then determines what (if any) further action is needed (e.g., send an SMTP alert, an email, an SNMP trap) and records the event in the embedded database 370.

The embedded database 370 is illustratively implemented as a Sybase relational database that exports a set of Structured Query Language (SQL) function calls that enable storage/retrieval of data, such as namespace objects, to/from the database. A schema of the database is configured to efficiently capture characteristics of a namespace independent of the storage access protocol, such as NFS or CIFS. The database 370 is illustratively organized as a plurality of tables, each of which can be accessed by processes within the NSM server. The DBI 360 is illustratively embodied as a SQL interface to the database and its associated tables, although it will be understood to those skilled in the art that the DBI may be embodied as any other type of database protocol interface depending on the actual implementation of the database, e.g., an Oracle database.

The API server 310 is illustratively embodied as a multi-threaded process that is configured to implement the APIs used by the NSM console 150 to access the database 370 and manipulate information stored thereon. The API server 310 also implements the communication protocol APIs used to interact with the remote agent 170. Accordingly, extensions to the API server 310 are primarily directed to those APIs required to manipulate the database and the remote agent. For example, APIs are invoked by a user (via the NSM console 150) to manipulate (modify, update) the embedded database 370. The API server 310 updates the database with respect to user configuration requests and the Monitor 340 periodically queries (polls) the database for any state/information change. Depending upon the change, the API server may cooperate with the Monitor to instruct data collection from the remote agent 170. After receiving the collected information from the remote agent, the Monitor 340 updates the database and the Event daemon 330.

C. NSM Application Infrastructure

In the illustrative embodiment, the NSM application 400 executes on the NSM console 150 and interacts with the NSM server 200 to integrate namespace management and storage management in storage system environment 100. The NSM server, in turn, interacts with one or more remote agents 170 installed on host machines in the environment to convey API function calls (hereinafter "APIs") that enable remote management of the resources. In an alternate embodiment, however, the NSM application can interact directly with machines hosting the remote agents. As noted, the NSM application (and NSM console) cooperates with the NSM server and remote agent to create the integrated management framework 300 that provides an underlying infrastructure that supports various heterogeneous storage access protocols within a single, logical namespace service.

The NSM application 400 is illustratively a "lightweight" JAVA-based client application executing on the NSM console 150, which is embodied as a computer having, e.g., a Windows, Linux or Solaris operating system platform. The NSM application 400 is illustratively a single process that, as a JAVA-based application, is characterized by a plurality of threads that can be easily ported to multi-platform instantiations. However, the NSM application is "lightweight" in that it does not require a persistent database and substantially all operations involve APIs executed on other host machines and servers.

Figure 4:
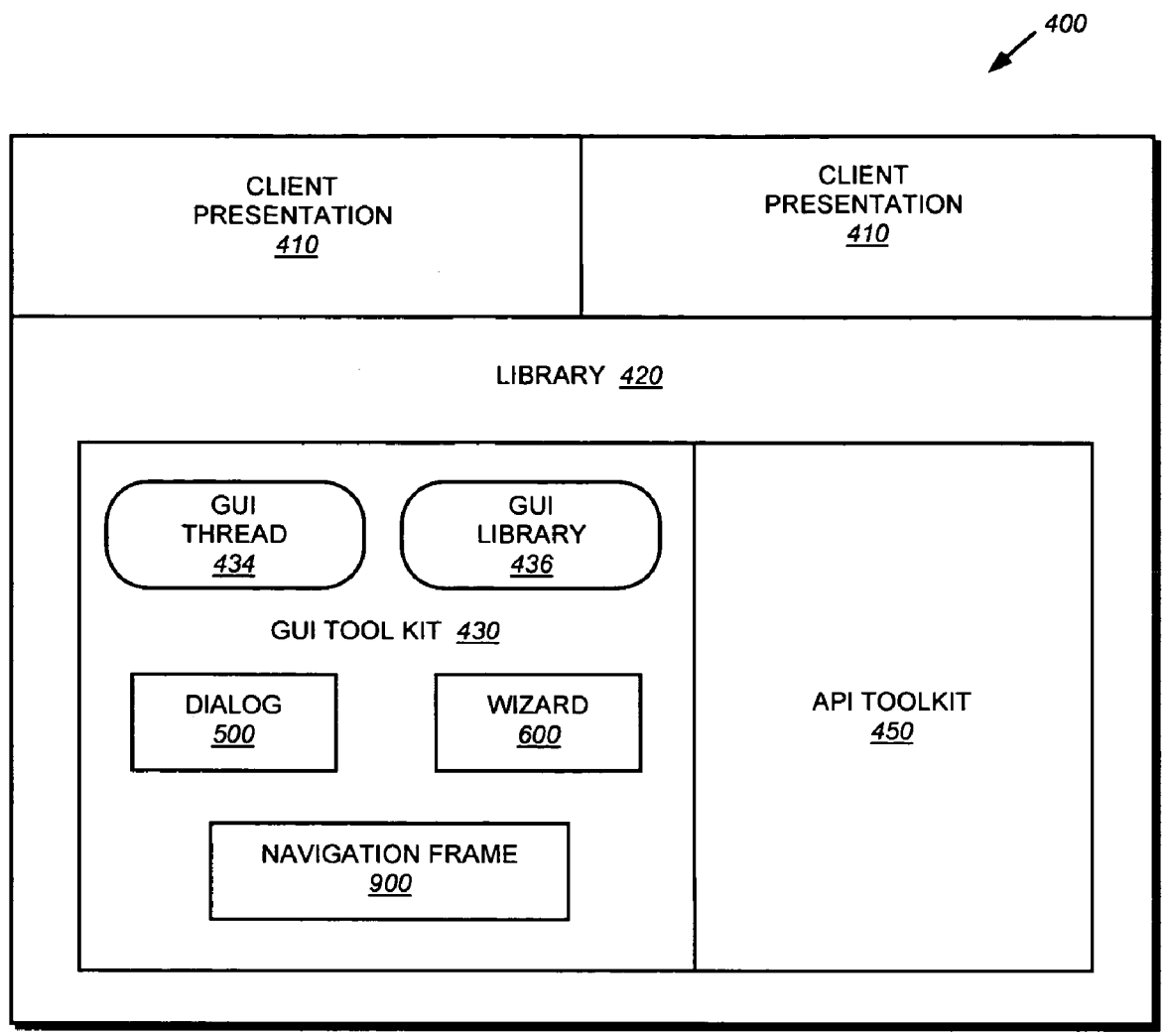
FIG. 4 is a schematic block diagram illustrating an architectural infrastructure of a namespace and storage management (NSM) application that may be advantageously used with the present invention.

FIG. 4 is a schematic block diagram illustrating an architectural infrastructure of the NSM application 400 that may be advantageously used with the present invention. The NSM application infrastructure comprises one or more client presentation layers 410 disposed over a library layer 420 that is embodied as graphical user interface (GUI) and application programming interface (API) components. The client presentation layers 410 may be directed to various GUI level presentations, such as storage management and namespace management. To facilitate support for various client presentation layers, the library layer 420 is apportioned into a GUI toolkit 430 configured to produce reusable GUI components and an API toolkit 450 configured to produce reusable API components that, in the illustrative embodiment, are directed to namespace and storage management functions. An example of an API toolkit that may be advantageously used with the present invention is disclosed in previously incorporated U.S. patent application Ser. No. 11/414,593 titled, Namespace and Storage Management Application Infrastructure for Use in Management of Resources in a Storage System Environment.

D. GUI Architecture

The present invention is directed to a GUI architecture configured to enable efficient management of resources in a storage system environment. The GUI architecture is embodied within the NSM application as GUI toolkit 430 that, according to an aspect of the invention, includes an infrastructure adapted to produce GUI components, such as a dialog box (dialog 500), a wizard 600 (e.g., a policy-creation wizard, a task-creation wizard) and a navigation frame 900. The GUI toolkit illustratively comprises a GUI thread 434 that cooperates with a GUI library 436 to provide user interface constructs used to generate layouts for these GUI components. The layouts are essentially reusable templates that do not contain content (text), i.e., the GUI components may be reused within the NSM application 400, as well as by applications other than the NSM application.

Broadly stated, the NSM application 400 spawns the GUI thread 434 that is used by the client presentation layer 410 and GUI toolkit 430 to provide GUI components that enable a user to input, e.g., commands for managing selected objects on various servers 130. The client presentation layer 410 translates the command to an operation and provides the operation, an operation failure handler and a group of managed objects to the API toolkit 450. The API toolkit 450 processes the operation to generate a plurality of APIs and spawns a plurality of threads ("worker threads") to manage the APIs directed to the managed objects of the group. As used herein, the term "API" denotes a collection of methods/functions ("routines") exposed by, e.g., processes of the integrated management framework 300 to which other processes issue calls. When a problem (failure) arises, the API toolkit 450 calls the operation (API) handler, which may result in the presentation of a GUI component, e.g., a dialog 500, by the client presentation layer 410. Notably, the behavior of the API in light of a failure is specified by the client presentation layer; as such, the API toolkit 450 handles API failures according to functionality provided by the client presentation layer 410.

Reusable Dialog Component

Figure 5:
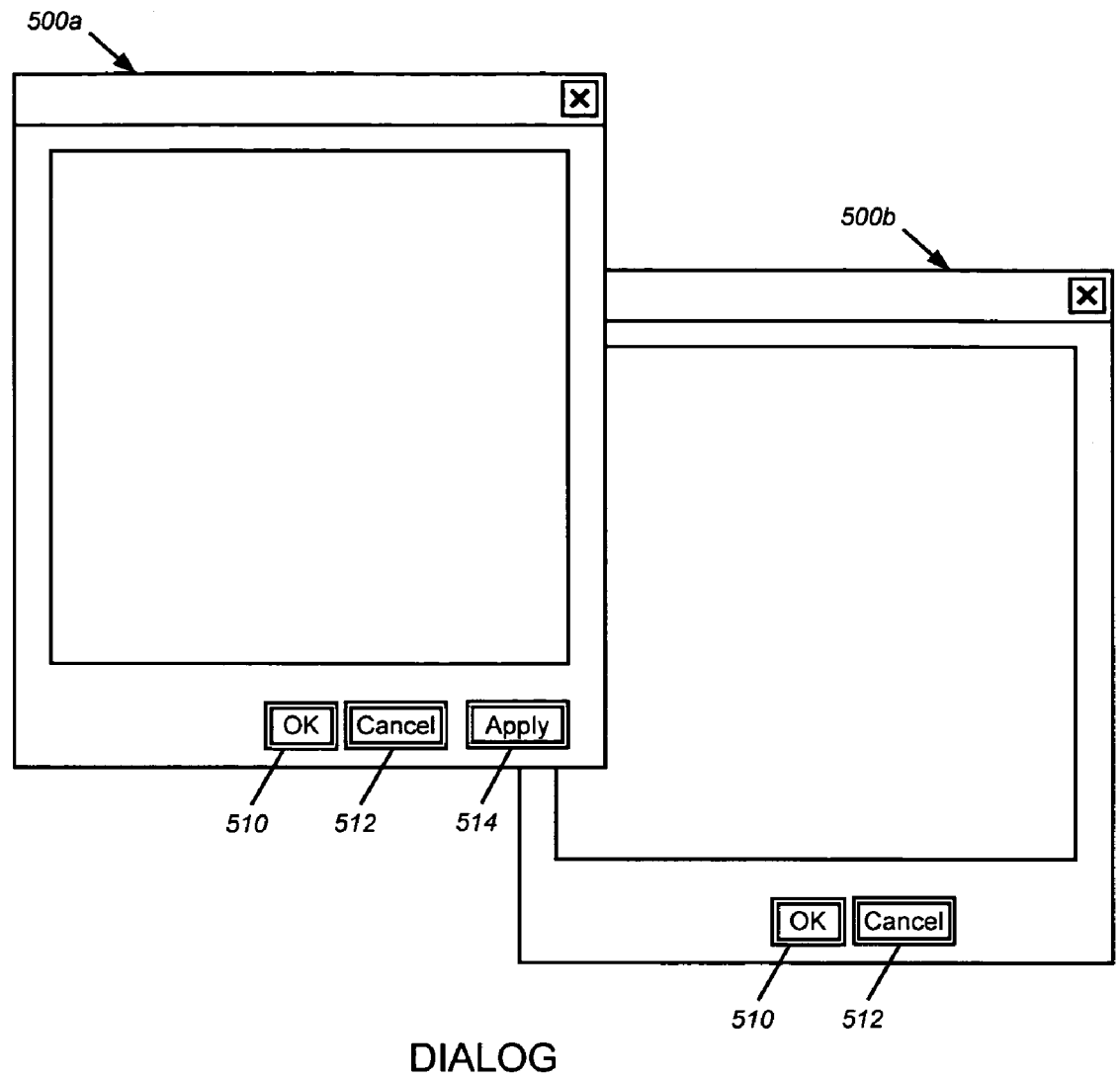
FIG. 5 is a schematic diagram of a reusable dialog component of a graphical user interface (GUI) toolkit in accordance with the present invention.

FIG. 5 is a schematic diagram of a reusable dialog component of the GUI toolkit in accordance with the present invention. The dialog 500 is a movable window that appears on a computer screen 155 of the NSM console 150 and that provides status, as well as available options for the NSM application 400 executing on the console. As its name implies, the dialog 500 serves to initiate a dialog (i.e., communication) between the NSM application and a user. The layout of the dialog 500 may be illustratively embodied in a plurality of forms 500a,b, each having an OK button 510 and a CANCEL button 512, with form 500a also having an APPLY button 514.

Reusable Wizard Component

Figure 6A:
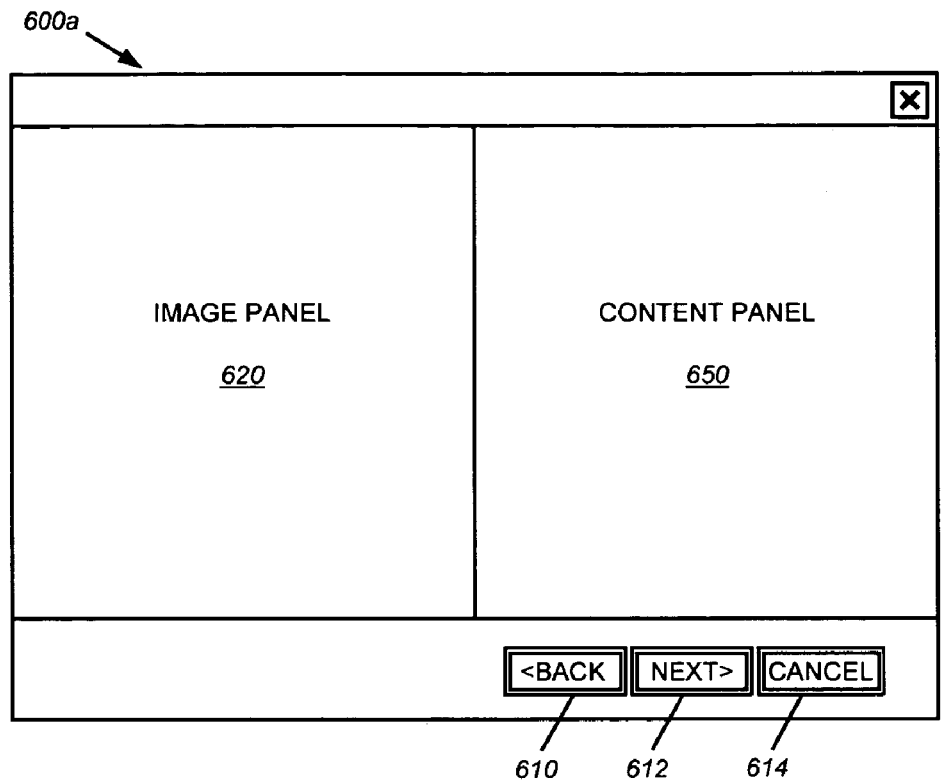
FIGS. 6A and 6B are schematic diagrams of a reusable wizard component of the GUI toolkit in accordance with the present invention.
Figure 6B:
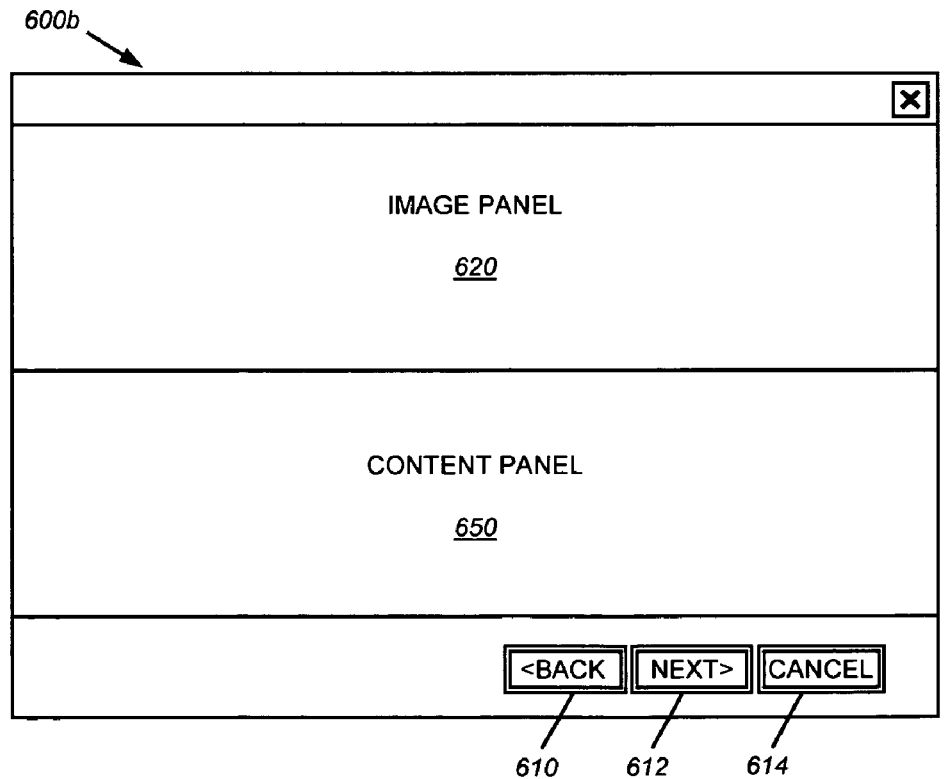

A wizard is an interactive utility that guides the user through an operation flow, such as installation of typical desk-top software. The wizard may be implemented as a sequence of dialogs among which the user can move forward and backward, inputting information as required by the flow. FIGS. 6A and 6B are schematic diagrams of a reusable wizard component of the GUI toolkit in accordance with the present invention. The layout of the wizard 600 may be illustratively embodied in a plurality of forms 600a, b, each having a BACK button 610, a NEXT button 612 and a CANCEL button 614. The wizard layout further includes various panels that provide a flexible template for inserting images and content. For example, the user can display an image of its choice on either a left panel 620 of wizard 600a (FIG. 6A) or a top panel 630 of wizard 600b (FIG. 6B). The remaining panel 650 of each wizard 600a, b is available for the user to populate with content.

Figure 7A:
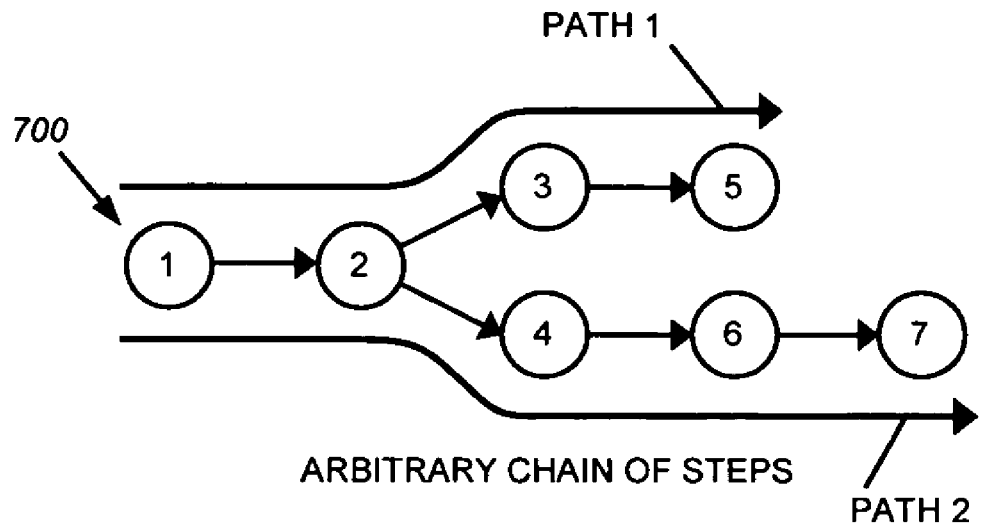
FIG. 7A is diagram illustrating an optimized operation flow that reflects an arbitrary chain of steps that may be advantageously used with present invention.

According to another aspect of the invention, the reusable wizard 600 allows users to make intelligent choices toward successful completions of desired actions by, e.g., only requesting information (steps) needed to accomplish those actions, such as creating a share on a particular machine. This aspect of the invention involves cooperation between the GUI library and GUI thread to create wizard templates (e.g., page layouts) that enable an optimized operation flow for each action, depending upon inputs by the user. FIG. 7A is diagram illustrating an optimized operation flow 700 that reflects an "arbitrary chain of steps" that may be advantageously used with the present invention. An example of such a flow is an installation of typical desk-top software using, e.g., an install shield tool that queries the user to choose either a simple or advanced installation procedure. Based on the user response, the operation flow follows one of two different paths (e.g., path 1 comprising steps 1, 2, 3, 5 or path 2 comprising steps 1, 2, 4, 6 7) through the remainder of the installation procedure. This example cannot be accommodated by the simple operation flow previously described because that flow requires pre-defined knowledge (in advance) of the steps that the user may follow. However, the arbitrary chain of steps operation flow is captured in the reusable wizard 600 of the present invention.

Figure 7B:
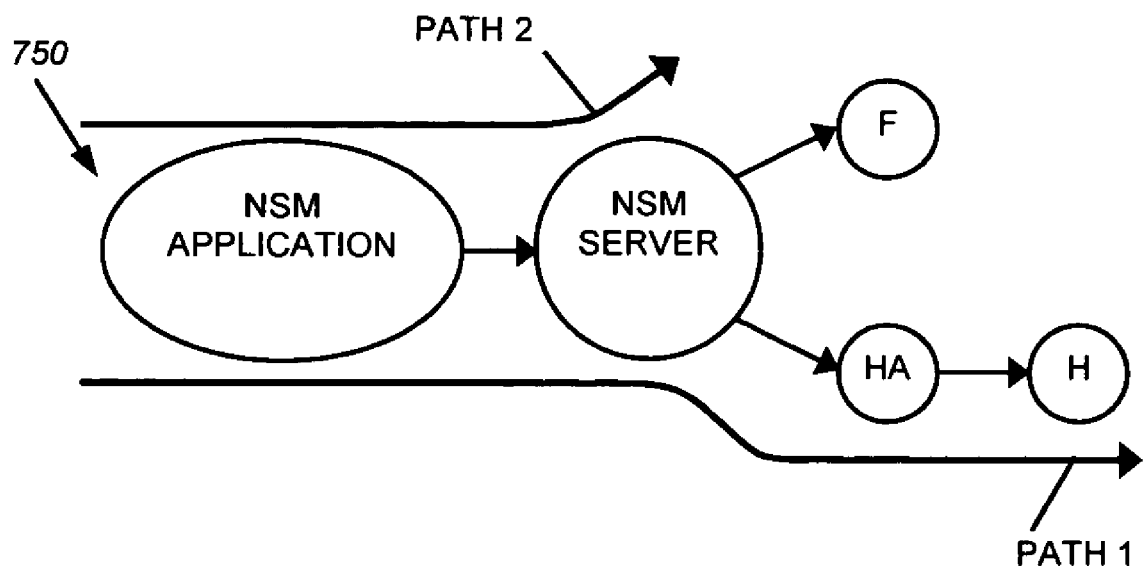
FIG. 7B is a schematic diagram depicting an optimized operation flow arrangement that may be advantageously used with the wizard in accordance with the present invention.

FIG. 7B is a schematic diagram depicting an optimized operation flow arrangement 750 that may be advantageously used with the wizard 600 in accordance with the present invention. Assume the NSM application 400 interacts with the NSM server 200 to access host machines with remote agents (HA) and without such agents (H), as well as filers (F). If a user wants to create a share on host machine H, the NSM application sends a message to the NSM server and onto the machine HA hosting the agent, which creates the share on machine H. The operation flow thus occurs along a path 1 from the NSM application and NSM server through HA to H. However, if the user wants to create a share on filer F, the NSM application sends a message to the NSM server, which communicates directly with the filer F to create the share. Here, the operation flow occurs along a path 2 from the NSM application and NSM directly to F.

According to the invention, the GUI toolkit 430 creates one or more wizard pages adapted to collect a name of the machine/server, a type of machine (e.g., filer F or host H), a share name of the share to be created, a directory where the share resides and, if the particular machine is host H, an agent. If the type of machine is a filer F, then the latter step (i.e., the agent) is skipped, thereby optimizing the operation flow. In the illustrative embodiment, a reusable host object is provided to resolve the type of machine query elicited by a wizard page. Depending on the user input, the GUI thread 434 calls an API to the host object. Once the machine type is resolved, the GUI thread calls decision logic of the GUI library 436 to optimize the flow.

As noted, the GUI toolkit 430 utilizes a single "main" GUI thread 434 to process user input events directed to the GUI components. An example of such an input event is a user "clicking" on the NEXT button 612 of wizard 600 (e.g., with a mouse) to essentially call a routine provided by that button. The GUI thread processes the input event which, in another example, may invoke an API on a host machine or server. While processing that event, the GUI thread 434 is typically "locked" (stalled) and, thus, cannot process other input events subsequently initiated by the user. To alleviate this situation, the NSM application 400 implements an asynchronous button callback technique that spawns additional GUI threads to process any of these subsequently-initiated user input events. Illustratively each time a button is clicked, a GUI thread is spawned to handle that event. As a result, the callback technique enables any button 610-614 to be clicked while the main GUI thread is stalled and obviate any GUI "hang-up" experience for the user.

Reusable Navigation Components

Figure 8:
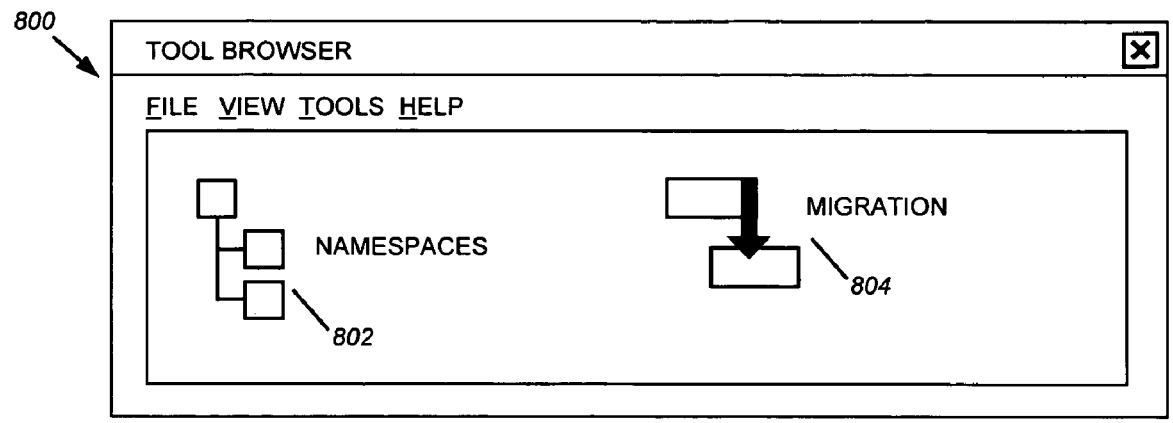
FIG. 8 illustrates a reusable navigation tool browser of the GUI toolkit in accordance with the present invention.

Upon launching the NSM application 400, an initial screen appears on the screen 155 of the NSM console 150 that prompts a user for its credentials (e.g., user name and password). In response to the user entering its credentials, a top-level client navigation tool browser appears on the NSM console. FIG. 8 illustrates the reusable navigation tool browser 800 of the GUI toolkit in accordance with the present invention. The layout of the tool browser 800 allows a user to select from available tools, represented as a name-spaces icon 802 and a migration icon 804, displayed on the screen 155. Depending on the type of server license (i.e., privileges as manifested by credentials) granted to the user, the namespace and/or migration icons appearing on the tool browser may be inaccessible. That is, if the user's credentials are insufficient to allow access to one or more of the tools, the corresponding icon is "grayed-out" and, thus, in accessible to the user. An example of an authentication procedure that may be advantageously used to determine whether a user's credentials are sufficient to enable access to the tools is disclosed in U.S. patent application Ser. No. 11/384,795 titled, System and Method for Administering Security in a Logical Namespace of a Storage System Environment, which application is hereby incorporated by reference.

Figure 9:
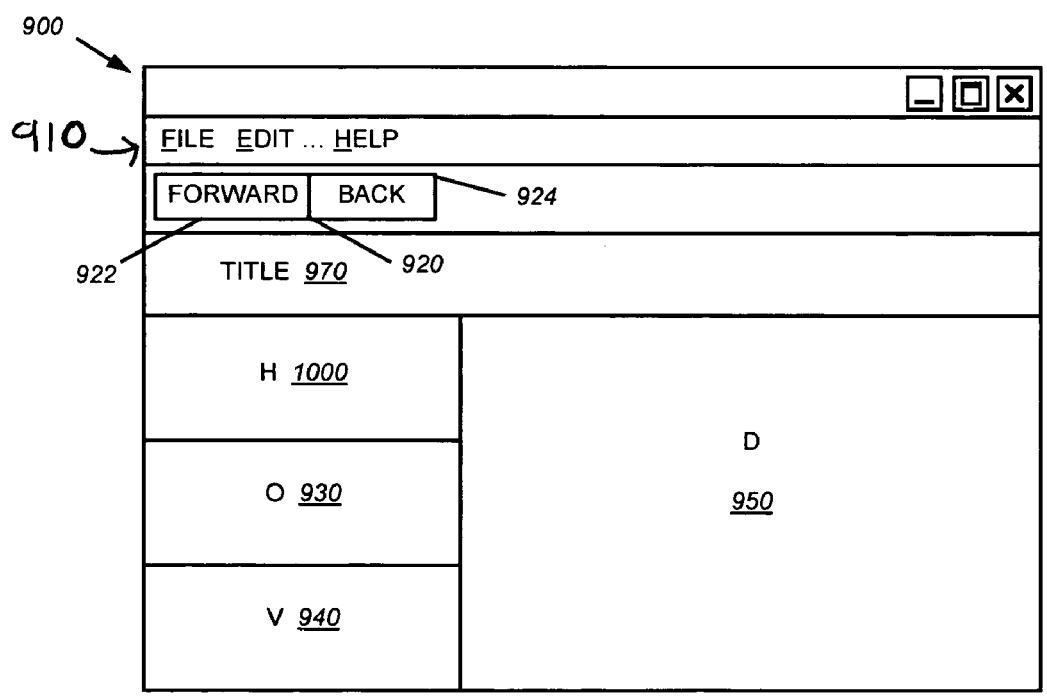
FIG. 9 is a schematic diagram of a reusable navigation frame of the GUI toolkit in accordance with the present invention.

A user selects a tool by, e.g., "clicking" on the associated icon and, in response, a navigation frame appears on the screen. The navigation frame is a GUI component comprising a GUI layout that may be reused for such purposes as namespace and storage management, including policy management. FIG. 9 is a schematic diagram of the reusable navigation frame 900 of the GUI toolkit in accordance with the present invention. The layout of the navigation frame 900 includes a conventional menu toolbar 910 with, inter alia, file, edit, and help menus. The navigation frame 900 also includes a browser-like forward/backward utility 920 having a forward button 922 and a back button 924 that enables a user to switch forward and back, respectively, between a plurality of navigation panels of the frame. Notably, the navigation panels are simultaneously displayed within the frame, and include a hierarchy (H) panel 1000, an operations (O) panel 930, a view (V) panel 940 and a display (D) panel 950, the latter adapted to display managed objects. The managed objects may comprise namespace objects (e.g., link points, shares) as well as data management objects (e.g., servers, files, disks) that may be displayed on panel 950 in either iconic or report format. A title portion 970 of the frame 900 displays a title of, e.g., the iconic managed objects or report.

Specifically, the hierarchy panel 1000 displays a navigation hierarchy of managed objects, such as namespaces, files, etc., in the form of, e.g., a tree structure. The operations panel 930 displays user executable operations, typically in a list, that are dynamically configured for objects selected from the hierarchy. That is, the user may select operations from panel 930 to be performed on the selected objects, assuming the user has the appropriate rights/permission to execute such operations. The view panel 940 displays a view configuration that provides various options by which to view (or sort) the selected objects, including various configuration formats such as, e.g., a list of icons or a detailed report. The display panel 950 displays the selected objects in a view configuration format, e.g., icons or reports, which is chosen from the view configuration of panel 940.

Assume there is a plurality of volumes distributed across a set of filers. This configuration may be displayed on the navigation frame 900 in accordance with a storage management feature. The navigation hierarchy panel representation is arbitrary and the content displayed may be filtered according to the context in which the panel is launched, as well as the rights/capabilities of the user (administrator). For example, the hierarchy displayed on panel 1000 may be a list of all namespaces, namespace policies and name-space reports. However, assume that the navigation hierarchy panel 1000 displays many filers, e.g., as a tree, and the view panel 940 displays volumes. A "rubber banding" technique can be used in the GUI to select many managed objects (e.g., volumes) at once and then an operation can be selected from panel 930 that is specific to the volume managed objects, e.g., online.

Figure 10A:
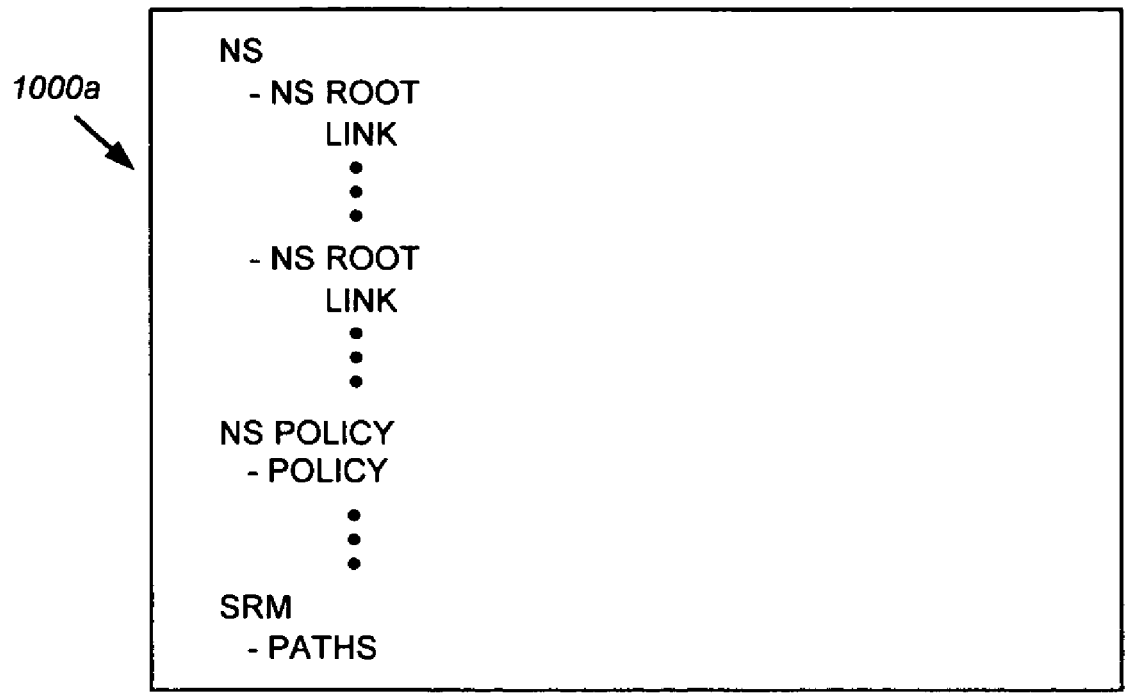
FIG. 10A is a schematic diagram illustrating namespace content displayed on a navigation hierarchy panel of the navigation frame in accordance with the present invention.

FIG. 10A is a schematic diagram illustrating namespace content displayed on the navigation hierarchy panel 1000a in accordance with the present invention. Assume a user selects the namespace icon from the navigation tool browser 800 by clicking on the icon, which launches the namespace tool. Note that the namespace tool illustratively enables integration of namespace management with storage management. Upon launching the namespace tool, a navigation hierarchy of top-level nodes appear on the hierarchy panel 1000a, e.g., in the form of a tree hierarchy. Assume one of the nodes is an iconic representation of a namespace node (NS). When the user clicks on the NS node icon, a list of namespace roots (NS root) and associated links appears on the panel. In the illustrative embodiment, the namespace roots represent DFS servers and the links represent physical storage or targets, such as CIFS shares. Note that a link could have multiple targets, primarily for reliability reasons, e.g., if one target fails, the link can back up to another target. Each target generally has the same storage capabilities.

Another top-level node that appears on the hierarchy panel 1000a is a namespace policy (NS policy) icon. In response to a user clicking on the NS policy icon, a list of policies created by the user appears on the panel. An example of a policy that may be created using, e.g., a policy wizard in accordance with the present invention is disclosed in previously incorporated U.S. patent application Ser. No. 11/384,711 titled, System and Method for Integrating Namespace Management and Storage Management in a Storage System Environment. Yet another top-level node on the panel 1000a is a storage resource management (SRM) icon that lists various SRM paths used for, e.g., data mining of a file system (archiving, etc) and reporting statistics.

Operations (tasks) may be linked into each of these top-level node hierarchies via the operations panel 930, while each hierarchy may have multiple view configurations via the view panel 940. For example, in response to the user clicking on an NS root icon and then selecting an icon view configuration, iconic representations of shares within the root appear as managed objects on the display panel 950. Alternately, selection of a report view configuration results in the display (on panel 950) of a report illustrating, e.g., characteristics of the root, such as name of the root, the host machine on which it resides, the number of links for the root, etc. There may be a list of different view configurations in panel 940 and the appearance of the managed objects may change by clicking on view configuration items in different columns. These items may be black or gray depending upon whether they are enabled or disabled according to the selected object type. In addition, some reports may apply for certain objects and not for others.

For example, by clicking on namespace roots, one of the views that can be selected is to show all the links. This recursively displays all of the links that are contained in all of the namespaces. In response to clicking on a particular root, the links for just that namespace group appear. Likewise the operations that are enabled or disabled apply according to the selected object. For example, by selecting a path that "creates name-space root", a wizard may appear to identify the server and the name for the namespace root. Thus, an administrator could use the CLI 315 on the NSM server to create/manage the logical namespace or the user could use the GUI to manage (e.g., create, delete, add links, etc) the namespace.

Figure 10B:
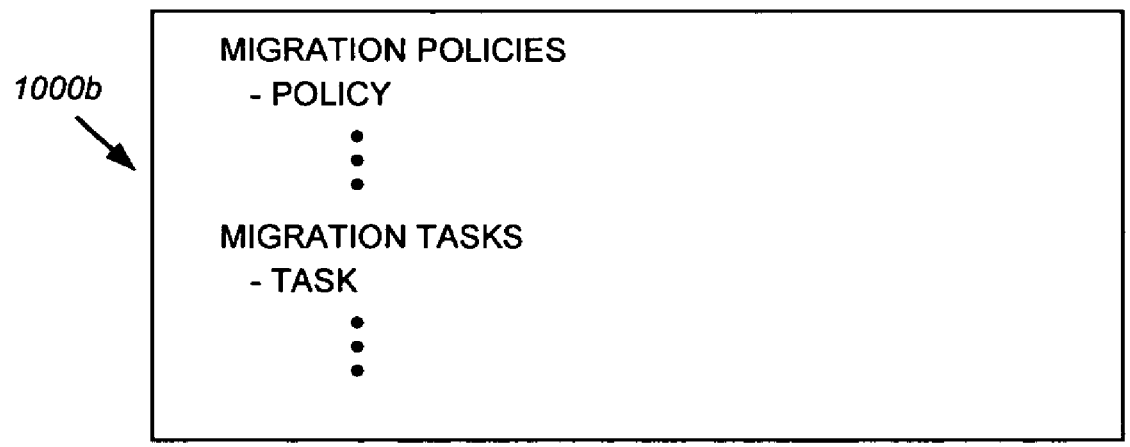
FIG. 10B is a schematic diagram illustrating migration content displayed on the navigation hierarchy panel in accordance with the present invention.

FIG. 10B is a schematic diagram illustrating migration content displayed on the navigation hierarchy panel 1000b in accordance with the present invention. Assume a user selects the migration icon from the navigation tool browser 800, thereby launching the migration tool. A top-level migration policies node appears on the panel 1000b, including a list of various policies created by the user. In addition, a migration tasks node appears with a list of various tasks (NSM server tasks) associated with the policies that can be monitored by the user. Examples of policies and tasks that may be advantageously used with the present invention are disclosed in previously incorporated U.S. patent application Ser. No. 11/384,711 titled, System and Method for Integrating Namespace Management and Storage Management in a Storage System Environment.

The foregoing description has been directed to specific embodiments of this invention. It will be apparent, however, that other variations and modifications may be made to the described embodiments, with the attainment of some or all of their advantages. For instance, it is expressly contemplated that the procedures, processes, layers and/or modules described herein may be implemented in hardware, software, embodied as a computer-readable medium having executable program instructions, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system comprising:
a namespace and storage management server having an integrated management framework executing program instructions for facilitating configuration of and management of pathnames in a logical namespace, and creating a layer of abstraction that presents to a client the logical namespace that is accessible via a particular storage access protocol, and extracting logical views and pathnames from the namespaces exported by heterogeneous services, and configuring the pathnames so that they are accessible in the logical namespace via the storage access protocols;
a namespace and storage management console having a computer screen; and
a namespace and storage management application executing on the management console, the namespace and storage management application configured to initiate performance of commands directed to managed objects including facilitating configuration and management of pathnames in a logical namespace, and configured to spawn a graphical user interface thread for use by a GUI toolkit, the GUI toolkit configured to produce reusable GUI components, the GUI components including a navigation frame having a plurality of navigation panels simultaneously displayed on the computer screen, the navigation panels including a hierarchy panel, an operations panel, a view panel and a display panel to allow a user to manage various said pathnames exported by heterogeneous namespace services and protocol implementations within the logical namespace, said GUI toolkit supporting reusable templates that facilitate reuse of the GUI components within one of the management application and other applications.

2. The system of claim 1 wherein the management console is embodied as a computer having an operating system platform.

3. The system of claim 1 wherein the namespace and storage management application is configured to spawn said graphical user interface thread for use by said GUI toolkit with a GUI library that cooperate to provide user interface constructs used to generate layouts for the reusable GUI components.

4. The system of claim 3 wherein the layouts are reusable templates that facilitate reuse of the GUI components within one of the management application and other applications.

5. The system of claim 4 wherein the GUI library and GUI thread further cooperate to create wizard templates that enable optimized operation flows for actions desired by one or more users.

6. The system of claim 5 wherein the wizard templates are configured to allow the user to make intelligent choices toward successful completions of desired actions by only requesting information needed to accomplish those actions.

7. The system of claim 1 wherein the GUI components further include a dialog and a wizard.

8. The system of claim 1 wherein the navigation frame has a layout that includes a forward/backward utility having forward and back buttons that enable a user to switch forward and back, respectively, between navigation panels of the frame.

9. The system of claim 1 wherein the hierarchy panel displays a navigation hierarchy of managed objects.

10. The system of claim 9 wherein the operations panel displays user executable operations that are dynamically configured for managed objects selected from the hierarchy.

11. The system of claim 10 wherein the view panel displays a view configuration that provides various options by which to view (or sort) the selected managed objects.

12. The system of claim 11 wherein the view configuration includes various configuration formats, such as a list of icons or a detailed report.

13. The system of claim 11 wherein the display panel displays the selected managed objects in a view configuration format chosen from the view configuration of the view panel.

14. The system of claim 13 wherein the managed objects comprise namespace objects and data management objects.

15. The system of claim 14 wherein the namespace objects comprise one of link points and shares, and wherein the data management objects comprise one of servers, files and disks.

16. The system of claim 9 wherein said hierarchy panel displays a list of at least one of namespaces, namespace policies and namespace reports.

17. The system of claim 16 wherein said hierarchy panel includes a namespace tool icon which when selected displays a list of namespace roots and associated links.

18. The system of claim 17 wherein said namespace roots represent DFS servers and said associated links represent physical storage or targets such as CIFS shares.

19. The system of claim 9 wherein said hierarchy panel displays a migration icon which when selected displays one or more tasks and policies for monitoring by a user.

20. The system of claim 1 wherein said GUI toolkit further comprises one or more wizard pages configured to collect information including at least one of a name of a machine or server, a type of machine or server, a share name of a share to be created, a directory where a share resides, and host agent information.

21. The system of claim 20 wherein said GUI toolkit is further configured to provide a reusable host object to resolve a type of machine query elicited by said wizard pages, and being further configured such that when machine type is resolved a GUI thread calls decision logic of a GUI library to optimize flow.

22. The system as defined in claim 1 further comprising a remote agent module installed on a server in a storage system environment, said remote agent module configured to manage a particular namespace and to interact with said namespace and storage management server via application program interfaces exposed by the remote agent.

23. A method comprising:
providing a namespace and storage management server;
inputting one or more commands at a namespace and storage management console, each command configured to manage one or more selected objects on one or more servers in a storage system environment;
executing a namespace and storage management application on the management console to initiate performance of the commands directed to the managed objects including facilitating configuration and management of pathnames in a logical namespace;
spawning a graphical user interface (GUI) thread used by a GUI toolkit of the management application to produce a navigation frame having a plurality of navigation panels, the navigation panels including a hierarchy panel, an operations panel, a view panel and a display panel thereby allowing a user to manage various pathnames exported by heterogeneous namespace services and protocol implementations within the logical namespace, said GUI toolkit supporting reusable templates that facilitate reuse of the GUI components within one of the management application and other applications;

extracting logical views from namespaces exported by the heterogeneous services;

configuring the pathnames such that said pathnames are accessible in the logical namespace via the storage access protocol; and displaying one or more navigation panels on the computer screen to allow the user to manage various pathnames exported by heterogeneous namespace services and protocol implementations within the logical namespaces.

24. The method of claim 23 further comprising displaying the selected managed objects on the display panel and in a view configuration format chosen from the view configuration of the view panel.

25. The method of claim 23 further comprising using an asynchronous button call back technique for spawning one or more additional GUI threads to process subsequently initiated user input events.

26. An apparatus comprising:

means for inputting one or more commands at a namespace and storage management console, each command configured to manage one or more selected objects on one or more servers in a storage system environment;

means for executing a namespace and storage management application on the management console to initiate performance of the command directed to the managed object including facilitating configuration and management of pathnames in a logical namespace;

means for spawning a graphical user interface (GUI) thread used by a GUI toolkit of the management application to produce a navigation frame viewable on an associated computer screen having a plurality of navigation panels, the navigation panels including a hierarchy panel, an operations panel, a view panel and a display panel thereby allowing a user to manage various pathnames exported by heterogeneous namespace services and protocol implementations within the logical namespace, said GUI toolkit supporting reusable templates that facilitate reuse of the GUI components within one of the management application and other applications;

means for extracting logical views from namespaces exported by the heterogeneous services;

means for configuring the pathnames such that said pathnames are accessible in the logical namespace via the storage access protocol; and means for displaying one or more navigation panels on a computer screen to allow the user to manage various pathnames exported by heterogeneous namespace services and protocol implementations within the logical namespaces.

27. The apparatus of claim 26 further comprising means for displaying the selected managed objects on the display panel and in a view configuration format chosen from the view configuration of the view panel.

28. A computer readable storage medium containing executable program instructions executed by a processor, comprising:

program instructions that provide a namespace and storage management server;

inputting one or more commands at a namespace and storage management console, each command configured to manage one or more selected objects on one or more servers in a storage system environment;

program instructions that execute a namespace and storage management application on the management console to initiate performance of the command directed to the managed object including facilitating configuration and management of pathnames in a logical namespace;

program instructions that spawn a graphical user interface (GUI) thread used by a GUI toolkit of the management application to produce a navigation frame having a plurality of navigation panels, the navigation panels including a hierarchy panel, an operations panel, a view panel and a display panel thereby allowing a user to manage various pathnames exported by heterogeneous namespace services and protocol implementations within the logical namespace, said GUI toolkit supporting reusable templates that facilitate reuse of the GUI components within one of the management application and other applications;

program instructions that extract logical views from namespaces exported by the heterogeneous services;

program instructions that configure the pathnames such that said pathnames are accessible in the logical namespace via the storage access protocol; and program instructions that display one or more navigation panels on the computer screen to allow the user to manage various pathnames exported by heterogeneous namespace services and protocol implementations within the logical namespaces.

29. The computer readable storage medium of claim 28 further comprising one or more program instructions for displaying the selected managed objects on the display panel and in a view configuration format chosen from the view configuration of the view panel.

30. A system comprising:

a plurality of storage systems of a storage environment, the storage systems configured to host both namespace objects and storage objects;

a first server platform of a first namespace server, the first server platform having a first storage access protocol and a first namespace service configured to provide a unique level of indirection between the first server platform and a storage system of the storage environment;

a second server platform of a second namespace server, the second server platform having a second storage access protocol that is different from the first storage access protocol and second namespace service configured to provide a unique level of indirection between the second server platform and the storage system of the storage environment;

an integrated management framework of a namespace management server, the integrated management framework configured to provide an underlying infrastructure that supports both the first and second storage access protocols in a single namespace service;

a namespace and storage management console having a computer screen; and a namespace and storage management application executing on the management console, the namespace and storage management application being configured to initiate performance of commands directed to managed objects including facilitating configuration and management of pathnames in a logical namespace, and the namespace and storage management application being further configured to spawn a graphical user interface thread for use by a graphical user interface (GUI) toolkit configured to produce reusable GUI components, the GUI components including a navigation frame having a plurality of navigation panels simultaneously displayed on the computer screen, the navigation panels including a hierarchy panel, an operations panel, a view panel and a display panel to allow a user to manage various pathnames exported by the first and second namespace servers within the single namespace service.

31. A method of providing a graphical user interface for a namespace management system, comprising:
- providing a namespace and storage management system having a console with a computer screen;
- a namespace and storage management application executing on the management console, the namespace and storage management application being configured to initiate performance of commands directed to managed objects including facilitating configuration and management of pathnames in a logical namespace, and the namespace and storage management application being further configured to spawn a graphical user interface thread for use by a graphical user interface (GUI) toolkit configured to produce reusable GUI components, the GUI components including a navigation frame having a plurality of navigation panels simultaneously displayed on the computer screen, the navigation panels including a hierarchy panel, an operations panel, a view panel and a display panel to allow a user to manage various pathnames exported by the first and second namespace servers within the single namespace service, said GUI toolkit supporting reusable templates that facilitate reuse of the GUI components within one of the management application and other applications;
- generating one or more wizards adapted to collect a name of each machine or server in the system, a type of machine, a share name of a share to be created, and a directory where the share is stored;
- resolving type of machine whether a filer or a host;
- if the type of machine is a host, then processing operations through a host agent;
- if the type of machine is a filer, then the step of processing operations through a host agent is skipped;
- displaying on said computer screen, dialog boxes for said wizards on pages of one or more GUI components; and
- using said dialog boxes, a user can make selections.

32. The method as defined in claim 31 wherein a reusable host object is provided for resolving the type of machine.

33. The method as defined in claim 32 further comprising:
- when type of machine is resolved, a graphic user interface toolkit calls decision logic from an associated graphic user interface library.

34. The method as defined in claim 33 further comprising:
- while processing an event in response to a user's selection, substantially simultaneously processing a second event at said namespace management server; and
- spawning additional graphical user interface threads for processing subsequently initiated user input events.

35. The method as defined in claim 34 further comprising using a call back technique enabling one or more buttons for user selection while a base graphic user interface thread is stalled, obviating graphic user interface hang up experiences for the user.

* * * * *